(12) United States Patent
Keller et al.

(10) Patent No.: US 7,496,912 B2
(45) Date of Patent: Feb. 24, 2009

(54) METHODS AND ARRANGEMENTS FOR ORDERING CHANGES IN COMPUTING SYSTEMS

(75) Inventors: Alexander Keller, New York, NY (US); Joseph L. Hellerstein, Ossining, NY (US); Vijaya Krishnan, Stamford, CT (US); Joel L. Wolf, Katonah, NY (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 10/789,123

(22) Filed: Feb. 27, 2004

(65) Prior Publication Data

US 2005/0192979 A1 Sep. 1, 2005

(51) Int. Cl.
*G06F 9/445* (2006.01)
*G06F 9/44* (2006.01)

(52) U.S. Cl. .................................. 717/174; 717/120

(58) Field of Classification Search ......... 717/120–123, 717/168–178
See application file for complete search history.

(56) References Cited

U.S. PATENT DOCUMENTS

| | | | |
|---|---|---|---|
| 4,751,635 A | 6/1988 | Kret | |
| 5,493,682 A | 2/1996 | Tyra et al. | |
| 5,634,056 A * | 5/1997 | Casotto | 707/203 |
| 5,721,824 A | 2/1998 | Taylor | |
| 5,805,891 A | 9/1998 | Bizuneh et al. | |
| 5,805,898 A * | 9/1998 | Barsness et al. | 717/175 |
| 5,835,777 A | 11/1998 | Staelin | |
| 5,867,714 A | 2/1999 | Todd et al. | |
| 5,890,166 A * | 3/1999 | Eisenberg et al. | 707/203 |
| 5,953,533 A | 9/1999 | Fink et al. | |
| 5,960,196 A | 9/1999 | Carrier, III et al. | |
| 5,960,206 A * | 9/1999 | Barsness et al. | 717/174 |
| 5,999,740 A | 12/1999 | Rowley | |
| 6,009,525 A | 12/1999 | Horstmann | |
| 6,052,707 A * | 4/2000 | D'Souza | 718/106 |
| 6,192,368 B1 * | 2/2001 | Gerard et al. | 707/103 R |
| 6,345,294 B1 * | 2/2002 | O'Toole et al. | 709/222 |
| 6,385,768 B1 * | 5/2002 | Ziebell | 717/121 |
| 6,477,660 B1 * | 11/2002 | Sohner | 714/1 |
| 6,675,382 B1 * | 1/2004 | Foster | 717/177 |
| 6,681,391 B1 * | 1/2004 | Marino et al. | 717/175 |
| 6,847,970 B2 * | 1/2005 | Keller et al. | 707/100 |
| 6,918,112 B2 * | 7/2005 | Bourke-Dunphy et al. | 717/177 |
| 6,952,825 B1 * | 10/2005 | Cockx et al. | 718/102 |
| 7,027,996 B2 * | 4/2006 | Levinson | 705/8 |
| 7,076,417 B2 * | 7/2006 | Jain et al. | 703/20 |
| 7,286,999 B2 * | 10/2007 | Majd et al. | 705/8 |
| 7,290,258 B2 * | 10/2007 | Steeb et al. | 717/178 |

(Continued)

OTHER PUBLICATIONS

Dean, Thomas, "Using Temporal Hierarchies to Efficiently Maintain Large Temporal Databases", 1989, ACM, p. 687-718.*

(Continued)

*Primary Examiner*—Wei Y Zhen
*Assistant Examiner*—Qing Chen
(74) *Attorney, Agent, or Firm*—Ference & Associates LLC

(57) ABSTRACT

Methods and arrangements for automatically determining allowable sequences of changes, e.g., sequences where the order in which changes are carried out will transition a computing system from a workable state into another workable state, are disclosed.

37 Claims, 8 Drawing Sheets

U.S. PATENT DOCUMENTS

2004/0039935 A1* 2/2004 Pisecky ............... 713/200
2004/0243995 A1* 12/2004 Sheehy ............... 717/174

OTHER PUBLICATIONS

Szymanek et al., "Partial Task Assignment of Task Graphs under Heterogeneous Resource Constraints," Jun. 2003, ACM, p. 244-249.*

Adve et al., "Parallel Program Performance Prediction Using Deterministic Task Graph Analysis," Feb. 2004, ACM, p. 94-136.*

J. Blazewicz, K. Ecker, G. Schmidt, J. Weglarz, Scheduling in Computer and Manufacturing Systems, Springer-Verlag, 1993.

E. Coffman, editor, Computer and Job-Shop Scheduling Theory, John Wiley and Sons, 1976.

M. Pindeo, Scheduling: Theory Algorithms and Systems, Prentice Hall 1995.

E. Lawler, Combinatorial Optimization: Networks and Matroids, Holt, Rinehart and Winston, 1976.

W. Press, B. Flanner, S. Teukolsk, W. Vetterling, Numerical Recipes: The Art of Scientific Computing, Cambridge University Press, 1986.

M. Garey, D. Johnson, Computers & Intractability: A Guide to the Theory of NP-Completeness, W. H. Freeman & Company, 1979.

R. Motwani, P. Raghavan, Randomized Algorithms, Cambridge University Press, 1995.

The Institute of Electrical and Electronics Engineers, Inc., 1996, IEEE Standard for Information Technology—Portable Operating System Interface (POSIX) System Administration Part 2: Software Administration.

CAE Specification, Systems Management: Distributed Software Administration (XDSA), The Open Group, Jan. 1998.

* cited by examiner

| APIs | Functional Description |
|---|---|
| getTaskGraphForInstall() | Task Graph for the Install change management operation is built. The activities in a workflow (process, flow, sequence) are created and populated with values from the Dependency Graph |
| getTaskGraphForUpdate() | Task Graph for the Update change management operation is built. The activities in a workflow (process, flow, sequence) are created and populated with values from the Dependency Graph |
| getTaskGraphForUninstall() | Task Graph for the Uninstall change management operation is built. The activities in a workflow (process, flow, sequence) are created and populated with values from the Dependency Graph |
| getTaskGraphForRollback() | Task Graph for the Rollback change management operation is built. The activities in a workflow (process, flow, sequence) are created and populated with values from the Dependency Graph |
| getTaskGraphForInitialConfigure() | Task Graph for the InitialConfigure change management operation is built. The activities in a workflow (process, flow, sequence) are created and populated with values from the Dependency Graph |
| getTaskGraphForConfigure() | Task Graph for the Configure change management operation is built. The activities in a workflow (process, flow, sequence) are created and populated with values from the Dependency Graph |

Fig. 8

METHODS AND ARRANGEMENTS FOR ORDERING CHANGES IN COMPUTING SYSTEMS

FIELD OF THE INVENTION

The present invention relates to distributed computing systems and, more particularly, to arrangements and methods for automatically determining allowable sequences of changes, e.g., sequences where the order in which changes are carried out will transition a computing system from a workable state into another workable state.

BACKGROUND OF THE INVENTION

Implementing changes for hardware, software, network and storage systems in large-scale eBusiness environments remains painful to customers: Rolling out changes, such as (un)installing, upgrading or configuring systems can take weeks, partly because the complex interdependencies between applications and their supporting services are not made explicit, thus requiring human involvement and expertise. Solving this change management problem automatically is important to address the increasing complexity of computing systems. The number of relationships of a single managed resource (a software artifact, a network component, a storage system) range from 10 to 100; the number of managed resource instance relationships in large-scale enterprise systems is often between 1,000,000 and 1,000,000,000. Given that a change to one or more managed resources may entail additional changes on a multitude of other managed resources, it is evident that the need for human involvement in the change management process needs to be minimized. This motivates the need for a generic approach that discovers allowable sequences of changes by interacting with the target systems.

The identification and tracking of relationships between the components of distributed systems is becoming increasingly important for change management. Software artifacts and their components rely on a variety of supporting artifacts. Consequently, applying a change to one artifact affects other artifacts, i.e., artifacts have dependencies on other artifacts. They exist between the components of different artifacts on a single system and also between the artifacts on multiple systems and organizational domains. Artifacts that depend on others are referred to as dependents, while artifacts on which other artifacts depend are referred to as antecedents. It is important to note that an artifact often plays both roles (e.g., a name service is required by many applications and services but is depending itself on the proper functioning of other services, such as the operating system and the network protocols and infrastructure), thus leading to a dependency hierarchy that can be modeled as a directed acyclic graph (DAG). Furthermore, dependency relationships are transitive, i.e., the dependent of a given component requires, in addition to the component itself, also the components' antecedent(s). Dependencies exist between various artifacts of a distributed system, such as end-user services, system services, applications and their logical and physical components.

Prior art in the area of software development [U.S. Pat. No. 4,751,635], [U.S. Pat. No. 5,960,196] and maintenance [U.S. Pat. No. 5,493,682] deals with individual software elements and modules that form the atomic parts of a program package and require the availability of program source code in order to build software and bundle it into software products. Source code is available to the software developer and not to the service user.

Prior art in the area of software packaging [U.S. Pat. No. 5,835,777] deals with individual software elements and modules that form the atomic parts of a program package and require the availability of program source code in order to build software and bundle it into software products.

[IEEE 1387.2 1995] addresses software distribution/deployment/installation. It defines a mechanism for ensuring that new software components (which are going to be installed) do not conflict with an already existing software installation. It identifies three kinds of relationships prerequisite, exrequisite, corequisite that facilitate such compatibility checks. This is done individually for every system on which new software needs to be installed. The software inventories present on other systems are not taken into account. Furthermore, this IEEE specification does not deal with instantiated applications and services and therefore does not represent any means of determining the dependencies between components at runtime.

[OpenGroup 1998] extends [IEEE 1387.2 1995] by defining several commands (swinstall, swlist, swmodify, etc.) that are invoked by software installation tools on a specific system. It also defines a software definition file format to make sure that the information required by the aforementioned commands is available from the system on which the commands are invoked. The shortcomings of [IEEE 1387.2 1995] (confined to a single isolated system, with no means for determining software dependencies at runtime) also apply to this specification.

Current Operating System Inventory implementations (such as the IBM AIX Object Data Manager (ODM), the LINUX RED HAT Package Manager (RPM) or the MICROSOFT WINDOWS Registry) follow either [OpenGroup 1998] and [IEEE 1387.2 1995] or describe the software inventory in a proprietary format. Thus, the aforementioned limitations also apply to them.

Techniques for electronic software distribution of whole program packages [U.S. Pat. No. 6,009,525] [U.S. Pat. No. 5,721,824] or updates/corrections/fixes/patches [U.S. Pat. No. 5,999,740] [U.S. Pat. No. 5,805,891] [U.S. Pat. No. 5,953,533] are, by definition, restricted to the distribution/deployment/installation of (one or many at a time) physical software packages and do not take the runtime stages of applications into account. In addition, they deal with one system at a time and do not take the cross-system aspects of applications and services into account.

Techniques for determining conflicts in existing software/hardware configurations [U.S. Pat. No. 5,867,714] are also confined to a single system and do not take runtime aspects into account.

There thus exists a need to describe a generic approach to discover allowable sequences of changes of artifacts, which prior art (such as the U.S. patent application Ser. No. 09/755,786, filed on Jan. 5, 2001, and entitled "Systems and Methods for Service—and Rolebased Software Distribution") does not take into account. There is also a further need to determine dependency relationships in distributed systems (as disclosed in U.S. patent application Ser. No. 10/241,162, filed on Sep. 11, 2002, and entitled "Methods and Apparatus for Managing Dependencies in Distributed Systems"), and transforms such acquired relationships into task sequences that are linked by temporal ordering constraints. Examples of such constraints are: "Task X must finish before task Y can begin, Task X cannot start until task Y does, Task X cannot finish before task Y does, Task X cannot finish until task Y starts". These constraints apply to various types of change tasks, such as install, uninstall, configure, start, stop.

SUMMARY OF THE INVENTION

The present invention broadly directed to automatically determining allowable sequences of changes, i.e., the order in which changes are carried out will transition the target systems from a workable state into another workable state.

In summary, one aspect of the invention provides a method of determining an allowable order of changes in a distributed system, the method comprising the steps of determining existing relationship descriptions between components of the system; transforming acquired relationships into ordered tasks that are linked by temporal ordering constraints; and creating an order of changes taking into account task relationship constraints.

Another aspect of the present invention provides a system for determining an allowable order of changes in a distributed system, the system comprising an arrangement for determining existing relationship descriptions between components of the system; an arrangement for transforming acquired relationships into ordered tasks that are linked by temporal ordering constraints; and an arrangement for creating an order of changes taking into account task relationship constraints.

An additional aspect of the present invention provides a program storage device readable by machine, tangibly embodying a program of instructions executable by the machine to perform method steps for determining an allowable order of changes in a distributed system, said method comprising the steps of determining existing relationship descriptions between components of the system; transforming acquired relationships into ordered tasks that are linked by temporal ordering constraints; and creating an order of changes taking into account task relationship constraints.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 8 depicts examples of Task Graph Builder APIs according to an embodiment of the present invention.

DESCRIPTION OF THE PREFERRED EMBODIMENTS

Figure 1:
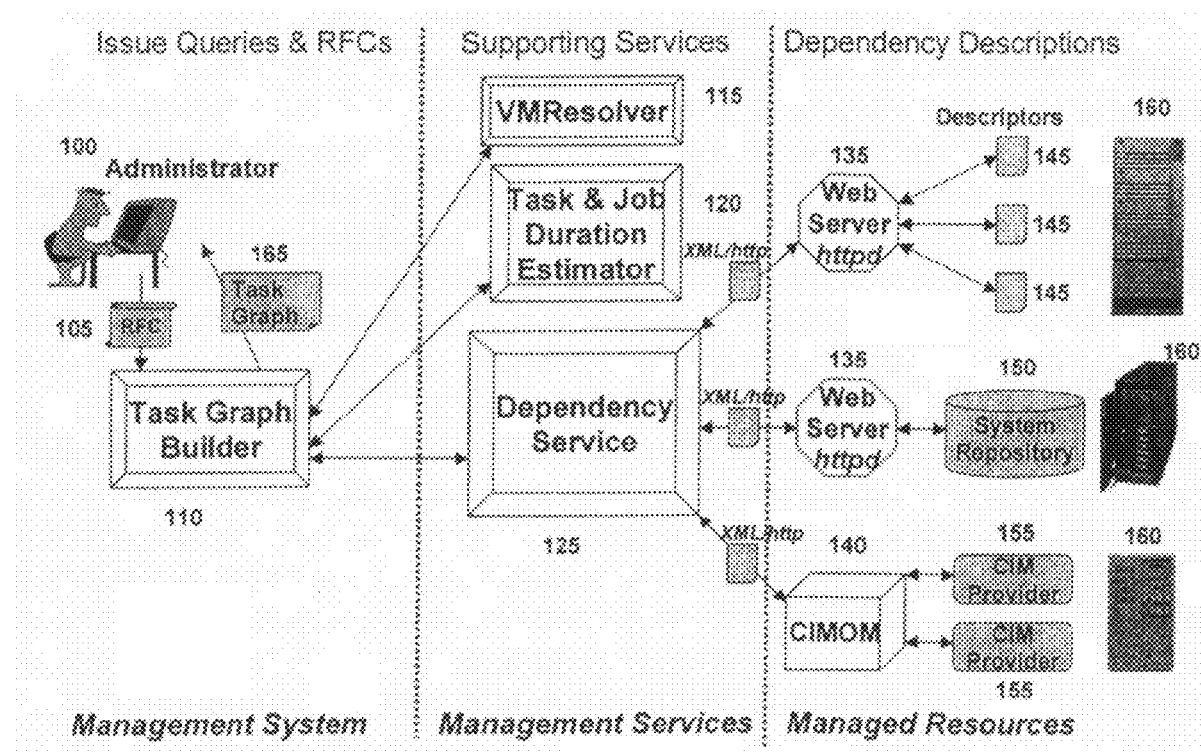
FIG. 1 is a block diagram illustrating the data flows between the various components involved in a system for ordering changes according to an embodiment of the present invention.

Several other copending and commonly owned U.S. patent applications, filed concurrently herewith, disclose various processes and arrangements whose details may, in the role of background information, help provide a better understanding of one or more of the embodiments disclosed and contemplated herein. Accordingly, those applications are hereby fully incorporated by reference as if set forth in their entirety herein, and are as follows (including the title and application serial number for each one): "Methods And Arrangements for Automated Change Plan Construction and Impact Analysis" (application Ser. No. 10/789,147); and "Methods and Arrangements for Planning and Scheduling Change Management Requests in Computing Systems" (application Ser. No. 10/789,099).

The change management process starts with the submission of a Request For Change (RFC), which is viewed as a job in scheduling terms. Many RFCs may be submitted concurrently. The RFC describes what is to be done, usually in terms of hardware/software artifacts to change (deploy, install, configure, uninstall), as well as the deadline by which the change needs to be completed. Examples include changing the schema of a database table in a running application and installing a new release of a web application server in a multi-tiered eCommerce system. An important observation is that many changes are not explicitly included in the RFC. Rather, they are merely implied. For example, applications must be recompiled if they use a database table whose schema is to change. Such implicit changes are a result of various kinds of relationships, such as service dependencies and resource sharing.

An RFC preferably contains the name of the artifact(s) that need to be changed, the name(s) of the target system(s) and the requested operation (e.g., "update the orderDisplay and buyConfirmation servlets, as well as the credit card transactions—CC XACTS—database table"). In addition, the RFC contains the deadline (time/date) by which the change must be completed, as well as its maximum allowable duration (e.g., a maintenance interval with a length of 2 hours, ending at 5 am). Note that an RFC is declarative by stating what needs to be accomplished, but leaves the procedural details (i.e., how the change is carried out) open. Based on the submitted RFC, the system disclosed in the present invention, the Task Graph Builder, determines the allowable order of the tasks that are necessary to fulfill the RFC. To do so, it may exploit two sources of dependency information:

1. The first source comprises Deployment Descriptors that annotate software packages, which reside in a software repository or on a software installation server. Deployment descriptors (such as the ones used by LINUX RPM or AIX installp packages) provide meta-information, gathered at build time (and preferably automatically generated by the development tools), about a software package, such as identifying and version data, and dependency information. This dependency information lists the pre-requisites (packages that must be present on the system for an installation to succeed), the co-requisites (packages that must be jointly installed) as well as ex-requisites (packages that must be removed prior to installing a new package).

2. In addition to the dependency information available at build time, one needs to consider runtime dependency information that may vary over time and with the workload the system is subject to. In contrast to the dependency information captured in deployment descriptors, a Runtime Dependency Model captures dependencies that typically cross system boundaries.

However, one having skill in the relevant art will recognize that modifications in the way how dependencies are obtained by the task graph builder, as well as their representation, may be made without departing from the spirit and scope of the present invention. In particular, additional sources of dependency information may be available. With this information, containing the actual dependencies between the artifacts of a distributed system, the Task Graph Builder is able to determine the steps of a change as well as the order in which they have to be carried out. A representation of such information is called a Task Graph. An Annotated Task Graph comprises a task graph as well as time estimates for every task within the task graph; these estimates may have been obtained from previous deployments. Information stored within a task graph is specific to a given combination of artifacts, and may be decoupled from the target systems and their characteristics (e.g., CPU speed, RAM, free/available disk space).

The purpose of the Task Graph Builder is to create reusable Task Graphs for various change management operations from existing dependency descriptions. It was noted above that task graphs describe the order in which tasks need to be carried out to transition a system from a workable state into another workable state. The order described may be the complete or total order, or something less, in which case the order described would be a partial order. It is presently preferred that the order described be a partial order. In order to achieve this, a task graph may contain information about:

The change management operation that needs to be carried out, e.g., install, update, configure, uninstall,
the roles and names of the artifacts that are subject to a change (either directly specified in the RFC, or determined by the task graph builder),
the temporal and location constraints that may exist between tasks, based on artifact dependency information,
an estimate of how long every task is likely to take, based on the results of several previous deployments. This is needed to estimate the impact of a change in terms of downtime.

In a specific embodiment of the present invention, a task graph may contain—in addition to the aforementioned data—information that relates to the specific hardware characteristics of a target system (such as CPU speed, RAM or total/available disk space) or names and IP addresses of target systems. It should be recognized, however, that modifications in the way of what data is contained within task graphs, as well as their representation, may be made without departing from the spirit and scope of the present invention.

The invention adds architectural elements to a change management system (such as the concurrently-filed U.S. patent application respectively identified as: application Ser. No. 10/789,147 entitled "Arrangements and Methods for Automated Change Plan Construction and Impact Analysis") that enable it to initiate a change, trigger the acquisition of dependency relationship information along with temporal constraints, and its subsequent automated processing into change sequences. In order to achieve maximum efficiency of the change management process, this invention determines in which order changes need to be carried out to transition the target systems from a workable state into another workable state. In addition, the present invention determines whether changes are conflicting, and flags such potential violations to avoid breaking a system. The output of the invention can be consumed and modified by applications, comprising planning tools, schedulers, workflow editors, workflow management engines and automated provisioning systems for data centers, or by enterprise software distribution and configuration tools.

In addition, the present invention is able to automatically refine an incoming request for change by breaking it down into atomic tasks.

The present invention takes operational policies into account that define best practices. Examples of such policies are: "A application server must always be installed on a different system as a database server", "A specific version of a database management system must be present for an application server to function properly", "A servlet must be first quiesced before it can be upgraded", "On a clustered computing system, all application servers must have the same version and release levels".

Finally, the invention leverages state models to determine which state transitions are allowed, such as the one defined in the CIM Application Model. Examples of such state transitions are: "from state installable to state executable", but not "from state installable to state running". The method described in the present invention consists in reading the acquired relationship descriptions along with the temporal ordering constraints and combining them into a change task sequence. In particular, the method described here uses the relationship descriptions to determine whether change tasks must be carried out sequentially, or whether some (or all) of them can be carried out in parallel. It should be noted that the applicability of this invention is not confined to the problem area of software distribution, but can be used for all sorts of changes, such as (re)configuration of computing and software systems.

Referring now to FIG. 1 an architecture as well as the data flows between the various components involved in a system for ordering changes according to an embodiment of the present invention is depicted. It is assumed that Managed Resources (160) are able to provide descriptions of their system inventory, configuration files and their various dependencies (however, it should be noted that any data description format suits the purpose of the invention as well). The details on how this information can be acquired are as follows:

The most straightforward way is to provide appropriate instrumentation within the system and its applications and services; this information would then be exposed by means of Descriptors, e.g., as flat XML files (145) and made available to the other components of the system through a Web Server (135).
Alternatively, the Dependency Service (125) makes use of information stored in System Repositories (150) for generating appropriate service dependency information. This information would then be made available to the other components of the system through a Web Server (135).
Third, the Managed Resources (160) could expose their information by means of an instrumentation agent, called Common Information Model (CIM) Provider (155), which interacts with a CIM Object Manager (CIMOM) (140), as proposed by the Distributed Management Task Force (DMTF). The CIMOM would then expose the necessary information to the interested components.

In the center of the figure various management services are depicted. These are: a VMResolver Service (115), a Task and Job Duration Estimator Service (120), and the Dependency Service (125).

The change management process starts with the submission of a Request for Change (RFC) (105) to the Task Graph Builder (110) by the administrator (100). The process of creating the task graph, executed by the Task Graph Builder, comprises the following steps:

- Mapping the logical target names to a list of physical target systems, if needed.
- Collecting the required dependency information, either directly from managed resources (160), or from an intermediate data store.
- Estimating the duration for each task in the task graph as well as the overall duration (the makespan) of the job represented by the task graph, if needed.
- Creating an Annotated Task Graph by attaching task and job duration information, if needed.
- Delivering the (Annotated) Task Graph back to the Administrator. These steps are detailed below.

The RFC may, in addition to the artifact name and various other information described above, either explicitly identify the target system(s), refer to them via their role (e.g., Database Server, Web Application Server), or provide a logical name (or alias) for the targets. A common example for the latter, used e.g., in on demand environments, is "database server cluster on which customer X's data is hosted". This logical name maps to a set of physical target systems. If logical names are used, the VMResolver (115) needs to be given logical names to physical target systems at the time when the RFC is executed (vs. at the time when it is defined). In the software engineering literature, this technique is termed "late binding".

Once the artifact(s) that are subject to a change, the change management operation, and the target system names (or their roles) are determined, the Dependency Service (125) is invoked by the Task Graph Builder (110). The main tasks of the Dependency Service (125) are as follows:

- Expose a 'drill-down' method that, upon receiving the identifier of a service, returns: (1) either descriptions of its direct antecedents, i.e., the first level below the node representing the service, (2) the whole subgraph below the node representing the service, or (3) an arbitrary subset of the dependency graph (levels m to n below a given node).
- Provide a 'drill-up' method with the same facilities, targeting the dependents of the service.
- Additional methods for gathering and filtering information for classes and properties of managed objects are present.
- Obtaining the dependency information from the Managed Resources (160) by issuing queries over HTTP and applying filtering rules (as specified by the administrator (100) or the task graph builder (110)) to it.
- Combining the information into a data structure that is sent back to the management system as document.

The Dependency Service (125) processes the request, gathers all required dependencies and sends the results back to the Task Graph Builder (110), which—in turn—computes the Task Graph (165). Then, the Task Graph Builder collects—for every task within the task graph—the estimated task duration as well as the duration of the overall job represented by the task graph. It does this by querying the Task & Job Duration Estimator (120). Once the durations for the tasks and the overall job are determined, it annotates the task graph (165) with this information. Finally, the Task Graph Builder (110) delivers the Task Graph (165) to the Administrator (100).

Figure 2:
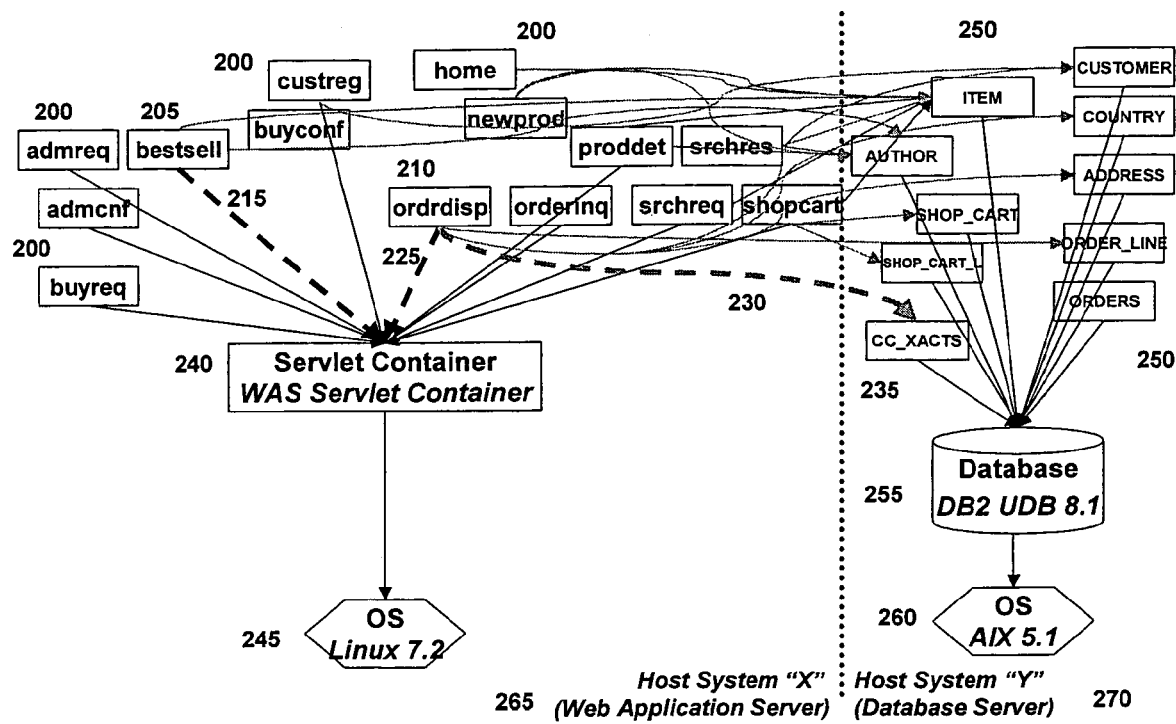
FIG. 2 is a block diagram illustrating the topology as well as the dependency relationships of an eCommerce Application System according to an embodiment of the present invention.

Referring now to FIG. 2 the topology as well as the dependency relationships of an eCommerce Application System, according to an embodiment of the present invention is depicted. Such a relationship model focuses on software artifacts and their logical (modules, components) and physical (files, shared libraries) architecture. It captures the detailed descriptions of SW components, i.e., the system inventory, which is usually recorded in the various system repositories or in well-defined places e.g., the configuration files of a Managed Resource (160). Examples of system repositories include, but are not limited to the IBM AIX Object Data Manager (ODM), the LINUX RED HAT Package Manager (RPM) or the MICROSOFT WINDOWS Registry. Information relating to software components is typically captured during the installation and deployment of a software package. In addition, the relationship model contains the dependencies between the various system components, depicted as arrows. For the sake of clarity, the names of the artifact types are written in normal typeface while the names of the products implementing them structural model are written in italic in FIG. 2.

Host system "X" (265) plays the role of a Web Application Server and hosts the following components: The E-business Application, which is preferably implemented by a total of 14 Servlets (200, 205, 210). The latter encapsulate the business logic of the application. The Servlet Container (240) is preferably implemented by IBM WEBSPHERE APPLICATION SERVER (WAS) Servlet Container. The Operating System (OS) is preferably LINUX version 7.2 (245).

Host system "Y" (270) plays the role of a Database Server and hosts the following components: 10 Database tables (235, 250) that hold the data accessed by the Servlets (200, 205, 210). The database tables reside within a Database preferably implemented by (IBM) DB2 UNIVERSAL DATABASE (UDB) version 8.1 (255), and an Operating System (OS), here preferably (IBM) ADVANCED INTERACTIVE EXECUTIVE (AIX) version 5.1 (260).

It is assumed that the RFC (105) submitted to the Task Graph Builder (110) specifies that two Servlets, BestSellers (bestsell) (205) and OrderDisplay (ordrdisp) (210) need to be installed on Host System "X" (265). It is further assumed that the Operating System (245) is already installed on Host System "X" (265); in addition, it is assumed the presence of an Operating System (260) on Host System "Y" (270). Finally, we assume that the change management system is subject to an operational policy, stating that a Servlet Container must be installed on a different system than a Database.

The invocation of the Dependency Service for this RFC yields the following dependencies (depicted in FIG. 2 by dashed lines): The bestsell Servlet (205) depends only on the Servlet Container (240) on Host System "X" (265). This dependency is illustrated by the arrow labeled (215). The ordrdisp Servlet (210)—in contrast—depends on both the Servlet Container (240) on Host System "X" (265) as well as on the Credit Card Transaction Table (CC_XACTS) (235) on Host System "Y" (270). The former dependency is illustrated by the arrow labeled (225); the latter by the arrow labeled (230). Determining the allowable partial order in which the following artifacts can be installed on two systems is of particular interest: bestsell Servlet (205), ordrdisp Servlet (210), Servlet Container (240), CC_XACTS Table (235), Database (255).

Figure 3:
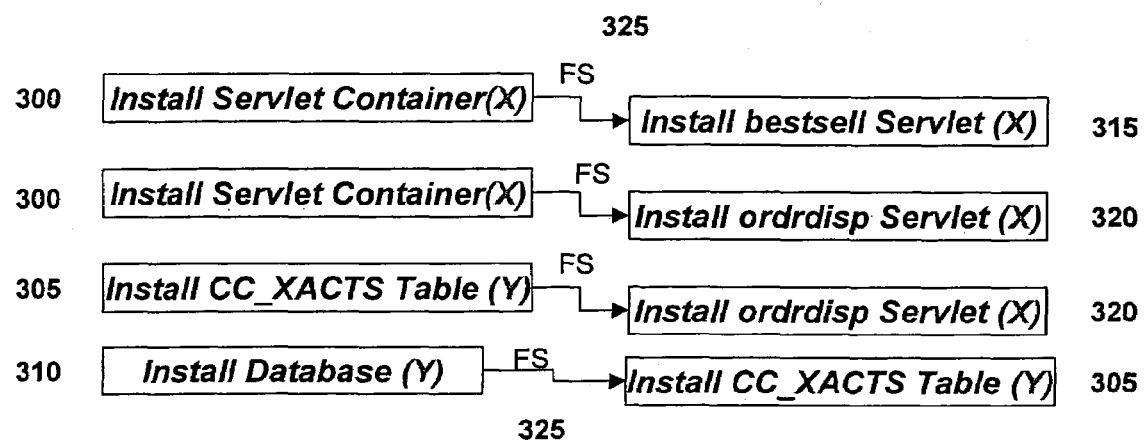
FIG. 3 is a block diagram illustrating the task relationships and relationship constraints according to an embodiment of the present invention.

Referring now to FIG. 3, task relationships and relationship constraints, according to an embodiment of the present invention are depicted. Typically, dependency information is available in units that specify for every artifact which other artifacts it requires. Such information is directly available, either from the descriptors of individual software packages (that list the pre-, co-, and ex-requisites of an artifact), or from system repositories. The system disclosed in U.S. patent application Ser. No. 10/241,162, filed on Sep. 11, 2002, and entitled "Methods and Apparatus for managing dependencies in distributed systems" provides a way to consolidate these atomic units of dependency information into a dependency graph that may span multiple systems by traversing, step by step, descriptors and/or repositories. The core component is a Dependency Service (125) that provides an API to execute operations for (recursively) traversing a dependency graph from the top to the bottom (drill-down), or in the opposite direction (drill-up). In the present embodiment, the Task Graph Builder (110) exploits this implementation by invoking the Dependency Service (125) and evaluating the returned dependency graph to determine whether tasks implied by a change must be carried out sequentially, or whether some of them can be carried out concurrently.

Different change management operations require different traversals through the dependency models: A request for a new installation of a software artifact leads the Task Graph Builder (110) to invoke a recursive drill-down operation on the Dependency Query Facility to determine which artifacts must already be present before a new artifact can be installed. On the other hand, a request for an update, or an uninstall of an artifact leads to the invocation of a recursive drill-up query to determine the artifacts that will be impacted by the change. The present embodiment preferably uses four of temporal constraint types:

Finish-to-Start (FS): This temporal constraint expresses that task A must finish before task B can begin and is the default constraint in workflow management systems. An example in a TPC-W eCommerce context is that a servlet container must be running (i.e., the task of starting it must be completed) before a new servlet can be deployed to it.

Start-to-Start (SS): Task B cannot start until task A does. An example for this constraint type are nested transactions and units of work.

Finish-to-Finish (FF): Task B cannot finish before task A does. Example: One cannot shutdown a system if the web application server is still running.

Start-to-Finish (SF): Task B cannot finish until task A starts. Example: a failover server cannot be taken offline before the main server is up again. Note that there is a subtle difference between this constraint type and the aforementioned FS constraint type, because here the start of a task determines the end of its predecessor (in the simpler FS case, the start of a task depends on the ending of its predecessor).

The evaluation of the RFC (105) by the Task Graph Builder (110) stating that an installation change management operation needs to be carried out, and the consideration of the results of the relationship traversal, carried out by the Dependency Service (125), yield that the following tasks are subject to relationship constraints:

The "Install Servlet Container on Host System "X"" task (300) must be finished ("FS" type relationship constraint) (325) before the "Install bestsell Servlet on Host System "X"" task (315) can be started.

The "Install Servlet Container on Host System "X"" task (300) must be finished ("FS" type relationship constraint) (325) before the "Install ordrdisp Servlet on Host System "X"" task (320) can be started.

The "Install CC_XACTS Table on Host System "Y"" task (305) must be finished ("FS" type relationship constraint) (325) before the "Install ordrdisp Servlet on Host System "X"" task (320) can be started.

The "Install Database on Host System "Y"" task (310) must be finished ("FS" type relationship constraint) (325) before the "Install CC_XACTS Table on Host System "Y"" task (305) can be started.

With this information, the Task Graph Builder (110) can proceed with consolidating the tasks.

Figure 4:
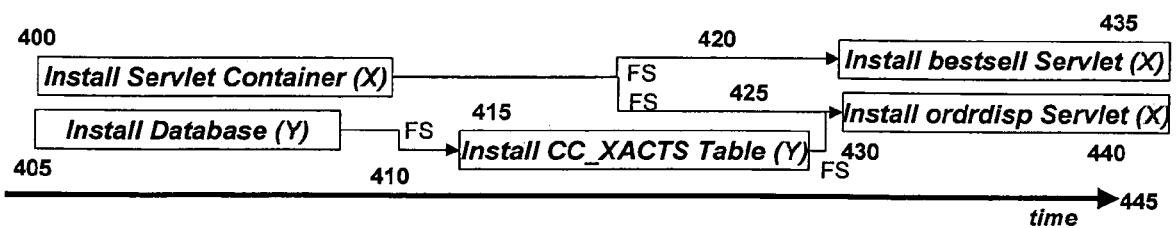
FIG. 4 is a block diagram illustrating the task graph as a result of the task consolidation step according to an embodiment of the present invention.

Referring now to FIG. 4, a task graph for installing the bestsell and ordrdisp servlets of the Internet storefront application, according to an embodiment of the present invention is depicted. The existence of a dependency between two artifacts indicates that a relationship (FS, SS, FF, SF) constraint or a location constraint (e.g., a policy forbidding collocation of Database and Servlet Container) exists between the dependent and the antecedent. The Task Graph Builder preferably observes the following rules:

Any task may have zero or more incoming and outgoing links.

If—within a set of task relationships—a task is the predecessor of several other different tasks, one instance of this task is chosen and for every succeeding task an outgoing link is attached to this task.

If—within a set of task relationships—a task is succeeding several other different tasks, one instance of this task is chosen and for every preceding task an incoming link is attached to this task.

If a relationship constraint exists between two tasks, they need to be carried out within a sequence.

If two tasks share the same predecessor and no temporal constraints exist between them, they can be executed concurrently within a flow.

The container for grouping tasks and their constraints on a per-host basis is a sequence.

The outermost container for grouping per-host sequences is a process.

By following the above rules, the Task Graph Builder (110) is able to consolidate the Task Relationships depicted in FIG. 3 into the following Task Graph (165) consisting of two sequences that are grouped on a per-host basis and aggregated into a process.

The "Host X sequence" consists of the following tasks and links: The "Install Servlet Container on Host System "X" task (400) has two outgoing "FS"-type links (420, 425) pointing to the "Install bestsell Servlet on Host System "X""task (435) and "Install ordrdisp Servlet on Host System "X"" task (440), respectively.

The "Host Y sequence" consists of the following tasks and links: The "Install Database on Host System "Y"" task (405) has one outgoing "FS"-type link (410) pointing to the "Install CC_XACTS Table on Host System "Y"" task (415).

Finally, one link (430) crosses the two per-host sequences, because the The "Install CC_XACTS Table on Host System "Y"" task (415) must be finished ("FS" type relationship constraint) (430) before the "Install ordrdisp Servlet on Host System "X"" task (440) can be started.

The time axis (445) is used to illustrate the order in which these tasks need to be carried out.

Once the Task Graph is built, the Task Graph Builder can proceed with the last step, namely constructing the Annotated Task Graph by assigning the estimated durations to every task within the task graph and computing the makespan for the overall job represented by the Task Graph.

Figure 5:
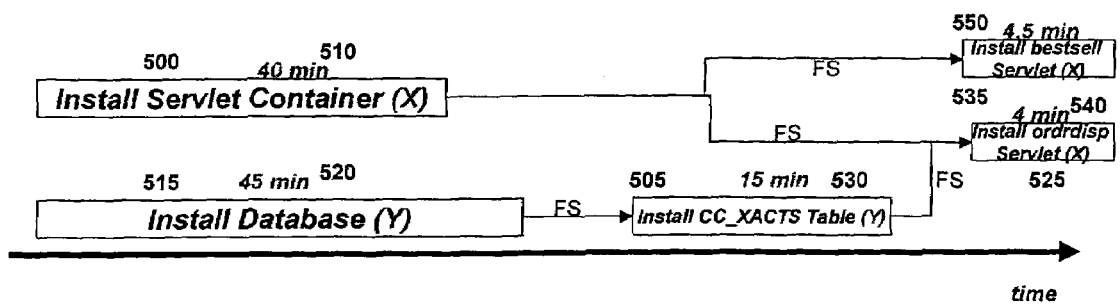
FIG. 5 is a block diagram illustrating the annotated task graph as a result of the task annotation step according to an embodiment of the present invention.

Referring now to FIG. 5, the annotated task graph as a result of the task annotation step is depicted, according to an embodiment of the invention. It is generated by the Task Graph Builder (110) by invoking the Task & Job Duration Estimator (120) for every individual task, annotating the Task Graph (165) with this data, and computing the makespan for the overall job (and annotating the process with this data) represented by the Task Graph.

The results are as follows:
- The "Install Servlet Container on Host System "X" task (500) has a duration of 40 minutes (510).
- The "Install bestsell Servlet on Host System "X"" task (535) has a duration of 4.5 minutes (550).
- The "Install ordrdisp Servlet on Host System "X"" task (525) has a duration of 4 minutes (540).
- The "Install Database on Host System "Y"" task (515) has a duration of 45 minutes (520).
- The "Install CC_XACTS Table on Host System "Y"" task (505) has a duration of 15 minutes (530).

Consequently, the makespan for the overall process is 1 hour and 4 minutes. This annotated task graph (165) is then returned to the administrator (100).

It should be noted the, as mentioned above, the involved systems are referred to by their role (Application Server, Database Server) instead of their name. This facilitates the applicability of the same task graph to multiple systems in case multiple systems playing the same role are needed to fulfill a request for change (105).

Figure 6:
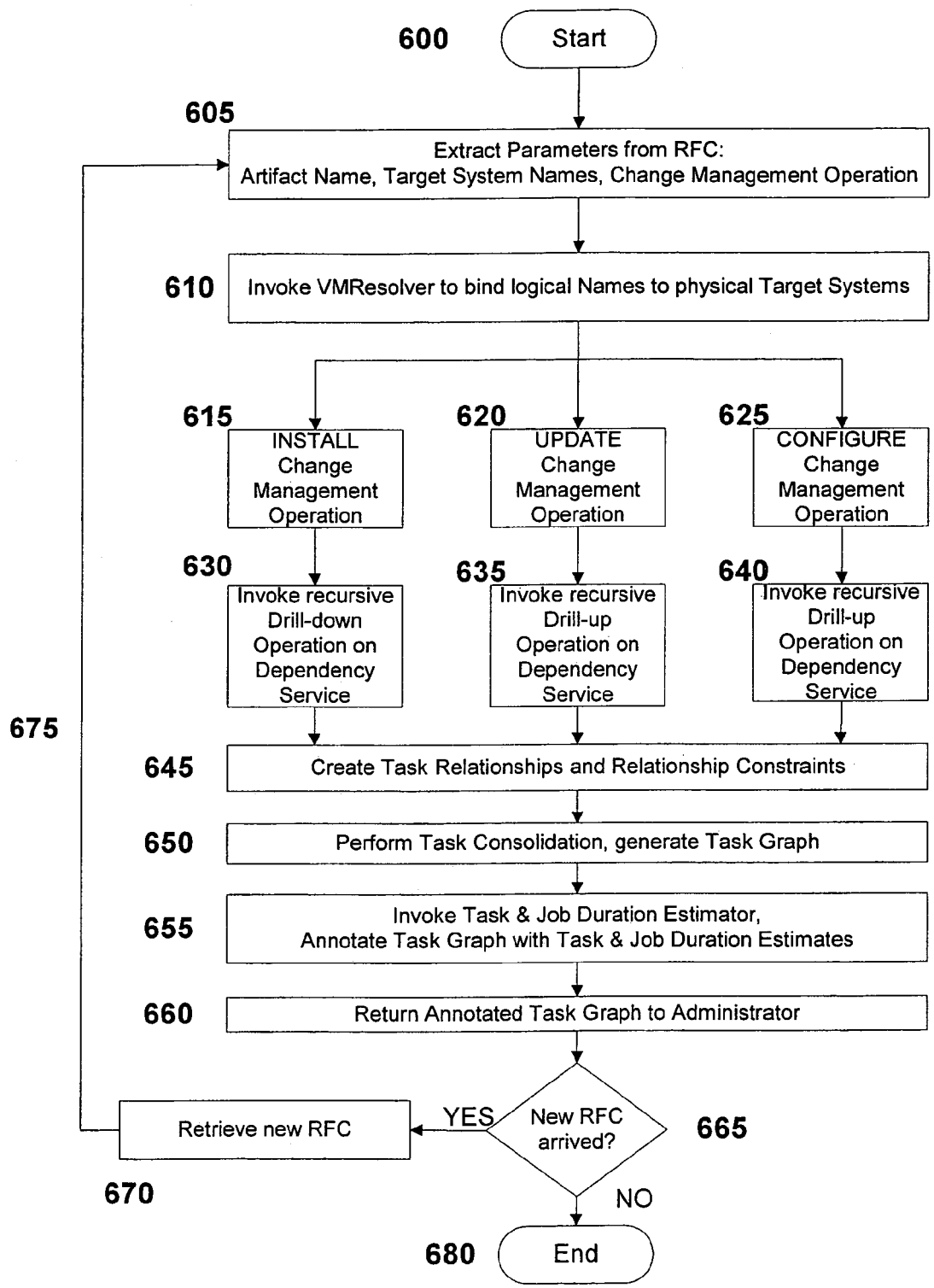
FIG. 6 is a flow diagram illustrating steps of actions for determining the order of Changes and Task Durations according to an embodiment of the present invention.

Referring now to FIG. 6, a flow diagram illustrates steps of actions for determining the order of changes and task durations, according to an embodiment of the present invention. The algorithm begins at block (600) and proceeds as follows: Upon receipt of a new RFC, the Task Graph Builder extracts the relevant parameters from the RFC (605): Examples of such parameters include, but are not limited to: The name of the artifact that needs to be changed, and the target system names, and the change management operation. The Task Graph Builder then proceeds with mapping the logical target names to a list of physical target systems. This is done by invoking the VMResolver component (115) from the Task Graph Builder (110), and by retrieving the results (610). Different procedures need to be applied according to the type of change management operation specified in the RFC: For example, an RFC may specify an INSTALL (615), an UPDATE (620), or a CONFIGURE (625) change management operation. One having skill in the relevant art will recognize that modifications and extensions of the change management operations may be made without departing from the spirit and scope of the invention. In the first case, the task graph builder would invoke a recursive drill-down operation (630) on the dependency service (125). The latter would return a list of artifacts that would need to be installed as well.

In the second case, the task graph builder would invoke a recursive drill-up operation (635) on the dependency service (125) to retrieve a list of artifacts that would actually be impacted by the UPDATE change management operation.

In the third case, the task graph builder would invoke a recursive drill-up operation (645) on the dependency service (125) to retrieve a list of artifacts that would actually be impacted by the CONFIGURE change management operation.

After these steps have been performed and depending on what change management operation has been specified in the RFC, the task graph builder would create in each case the task relationships as well as the relationship constraints (645) from the data returned by the dependency service. Then the task graph builder performs the task consolidation step (650) to generate a Task Graph, which needs to be subsequently annotated with the task and job duration estimates. To do so, the task graph builder invokes the task and job duration estimator (120), retrieves the results and proceeds with annotating the task graph (655). This annotated task graph is then returned to the administrator for further processing (660).

Finally, the task graph builder verifies whether one or more new RFCs have arrived for which the procedure needs to be repeated (665). If this is the case, the algorithm proceeds to step (670), retrieves the RFC and transitions (675) to step (605). Otherwise, the algorithm ends at block (680).

Figure 7:
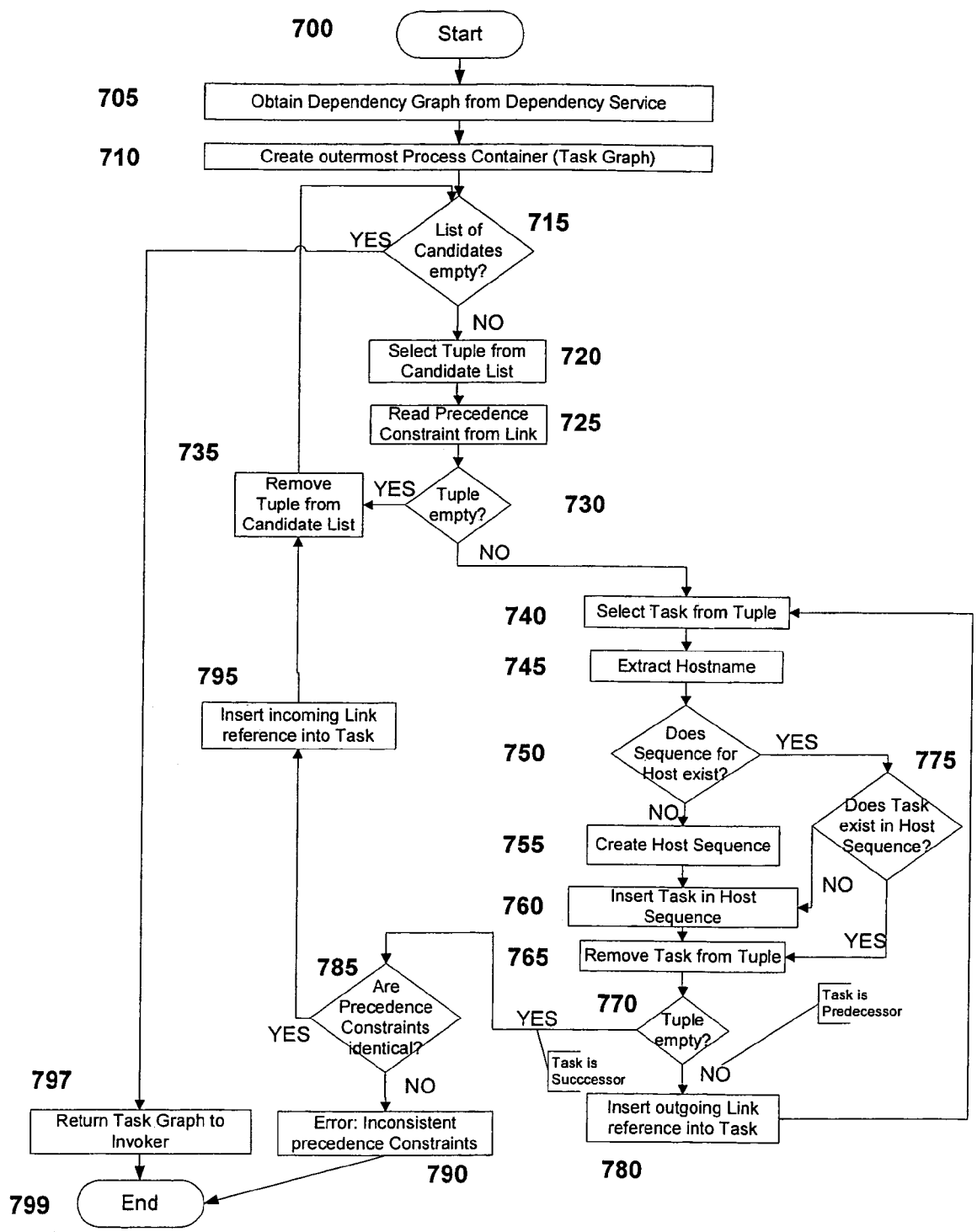
FIG. 7 is a flow diagram illustrating steps of actions for the construction of a Task Graph from Dependency Information according to an embodiment of the present invention.

Referring now to FIG. 7, a flow diagram illustrates steps of actions for the construction of a Task Graph from dependency information, according to an embodiment of the present invention. The algorithm begins at block (700) and proceeds as follows: Upon receipt of a Dependency Graph (705) from the Dependency Service (125), the outermost element of a workflow (a process container) is created (710) in which all other elements of a Task Graph will be subsequently inserted. The dependency graph contains a list of artifact tuples; the overall list of tuples is called candidate list. We assume that every tuple contains first the antecedent, and then the dependent artifact, each prefixed with the name of the change management operation the administrator (100) has specified in the RFC (105), and having the hostname as suffix. Every element of a tuple can then be referred to as task; the first element is the predecessor task, the second one is the successor. An example of a task is "Install Servlet Container on host "X"". In addition, every tuple stores a precedence constraint (such as FS, SS, SF, FF) that annotates the dependency link. One having skill in the relevant art will recognize that modifications and extensions to the way the dependency graph is represented may be made without departing from the spirit and scope of the invention. First, the algorithm determines if the list of candidates is empty (i.e., no tuples are present) (715).

If the list of candidates contains one or more tuples, the algorithm proceeds to block (720) and selects a tuple from the candidate list. No assumptions are being made with respect to the order of the tuples in the candidate list. In addition, the tuple selection can happen in any order, since the candidate list is essentially an unordered bag of tuples. Once a tuple is selected, the precedence constraint is read and stored for further processing (725). Then, the algorithm determines if the tuple is empty (i.e., no tasks are present) (730). If this is not the case, the algorithm selects a task from the tuple. Here, the order in which the tasks are chosen matters, because the first element of a tuple is the predecessor, while the latter task within the tuple is the successor. Once a task has been selected (740), the algorithm proceeds with extracting the hostname from the task by applying a simple read operation to the task suffix (745). Next, the algorithm determines if a sequence (a container that stores tasks in a partial order) for the chosen host already exists (750). If this is not the case, the algorithm creates such a host sequence (755) and subsequently inserts the currently selected task in the host sequence (760). Otherwise, the algorithm checks if the task already exists in the host sequence (775). This is needed to prevent duplicate tasks in a host sequence. If the task is not already part of the host sequence, it is inserted (760); otherwise, the algorithm proceeds to block (765). Finally, the task is removed from the tuple because it has already been processed (765).

The algorithm verifies again if the tuple is empty (770) and proceeds to block (780) if there is still a task in the tuple. A remaining task is by definition the successor task, as the predecessor has already been removed from the tuple in step (765) and placed into the host sequence. Consequently, block (780) inserts an outgoing link reference (i.e., a pointer to a successor task, referring to the successor by its name) in the task of the host sequence. The algorithm proceeds then to block (740) and applies the task procedure (blocks 740 to 765) to the remaining successor task, and removes this task from the tuple as well afterwards (765). This is needed because the successor task may well refer to a different host for which a host sequence may either already exist, or not (cf. block (750)). In addition, a check for task duplicates in block (740) needs to be carried out for the successor task as well. After the removal of the successor task, the tuple is then empty, and the check in block (770) yields a positive result. The algorithm then proceeds to block (785), where the precedence constraint that is both embedded in the link reference of the incoming link reference of the successor task being contained in the host sequence (potentially from a previous iteration of the algorithm) is compared to the one that is kept in memory (cf. block (725)) for the current tuple instance. This is needed to ensure that the precedence constraint specified in the most recently inserted tuple is consistent with a precedence constraint between the same tasks that may have been inserted into the host sequence previously.

If the algorithm determines in block (785) that the newly inserted precedence constraint is different from the one already stored, the algorithm exits with an error condition in block (790) and subsequently end at block (799). This check needs to be carried out only once for the incoming link reference of the successor task, because its precedence constraint is by definition identical to the one stored in the outgoing link of the predecessor task. Otherwise, the algorithm proceeds to block (795) and inserts an incoming link reference into the successor task before continuing at block (735) with the removal of the already processed tuple from the candidate list. Then, the algorithm proceeds to block (720) and determines if the procedure needs to be repeated for one or more additional tuples contained in the candidate list. If, however, no more tuples remain for processing (i.e., the list of candidates is empty), the completed task graph is then returned to the invoker (797). The algorithm ends at block (799).

Referring now to FIG. 8, examples of the Task Graph Builder APIs are shown. The table includes base APIs that can generate, send and request receipt of partial orders of change management tasks for a given service and host name. Those skilled in the art will appreciate that the APIs can use one or more parameters (not shown) to identify characteristics (specified in the Functional Description) used by the APIs. Specifically, the getTaskGraphForInstall(parameters) API builds the Task Graph for the INSTALL change management operation based on a recursive "Drill-Down", carried out by the Dependency Service. The getTaskGraphForUpdate(parameters) API builds the Task Graph for the UPDATE change management operation by invoking a recursive "Drill-Up" on the Dependency Service, i.e., it retrieves all the dependents of a given artifact, i.e., the artifacts in the dependency hierarchy that are likely to be affected by an UPDATE change management operation. The getTaskGraphForUninstall(parameters) API builds the Task Graph for the UNINSTALL change management operation. The getTaskGraphForRollback(parameters) API builds the Task Graph for the ROLLBACK change management operation, which is the opposite operation of UPDATE and restores the previously updated version of an artifact. The getTaskGraphForInitialConfigure(parameters) API builds the Task Graph for the INITIALCONFIGURE change management operation, which applies basic configuration settings to an artifact, which are needed to install it in the first place. The getTaskGraphForConfigure(parameters) API builds the Task Graph for the CONFIGURE change management operation, which applies advanced configuration settings to an artifact so that it can be customized.

For each of the APIs, an administrator is able to customize the results by indicating whether he is interested in retrieving simply the task graph, or the annotated task graph that contains the task duration estimates in addition to the task graph. This is done by setting a "no duration estimates" flag, an input parameter to the APIs, upon invocation. The annotated task graph is assumed to be the default.

It is to be understood that the present invention, in accordance with at least one presently preferred embodiment, includes an arrangement for determining existing relationship descriptions between components of the system; an arrangement for transforming acquired relationships into ordered tasks that are linked by temporal ordering constraints; and an arrangement for creating an order of changes taking into account task relationship constraints. Together, these may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-implemented method of automatically determining an allowable order of changes in a distributed system, the computer-implemented method comprising the steps of:

receiving a request for change;

wherein the request for change describes a task to be done on at least one target system, and a deadline by which a change needs to be completed;

determining existing relationship descriptions between components of the distributed system, wherein the components of the distributed system are implemented on a plurality of managed resources;

transforming acquired relationships into ordered tasks that are linked by temporal ordering constraints which describe when tasks can begin in relation to one another, wherein the temporal ordering constraints are selected from the group consisting of: Finish-to-Start, Start-to-Start, Finish-to-Finish, and Start-to-Finish;

creating an order of changes taking into account the temporal ordering constraints, wherein creating the order of changes includes determining whether the ordered changes are conflicting and flagging such conflicts and further includes an estimate of the time required to complete a change;

wherein the order of changes transitions the at least one target system from one workable state into another workable state;

building a Task Graph from the order of changes, wherein the Task Graph represents each task to be completed within an overall job;

constructing an Annotated Task Graph by assigning estimated durations to each task within the Task Graph; and computing a makespan for the overall job represented by the Task Graph, wherein the Annotated Task Graph is returned to an administrator.

2. The computer-implemented method of claim 1, wherein the order of changes is sequential.

3. The computer-implemented method of claim 1, wherein the order of changes is concurrent.

4. The computer-implemented method of claim 1, further comprising refining an incoming request for change by breaking the incoming request down into sub-requests.

5. The computer-implemented method of claim 4, further comprising computing an allowable order of changes by interacting with the distributed system.

6. The computer-implemented method of claim 4, wherein a total change time is minimized by exploiting parallelism between change tasks.

7. The computer-implemented method of claim 1, wherein the ordered changes are partially ordered.

8. The computer-implemented method of claim 1, wherein the ordered changes are totally ordered.

9. The computer-implemented method of claim 1, wherein the creation of the order of changes further takes into account a requested change management operation.

10. The computer-implemented method of claim 1, wherein a requester identifies one or more target systems within the distributed system by name.

11. The computer-implemented method of claim 10, wherein the names of the target systems are unique physical identifiers.

12. The computer-implemented method of claim 10, wherein the names of the target systems are logical names which refer to one or more physical systems.

13. The computer-implemented method of claim 1, wherein a requester does not identify one or more target systems within the distributed system by name.

14. The computer-implemented method of claim 1, further comprising the steps of accessing and evaluating policy roles representing best practices.

15. The computer-implemented method of claim 14, wherein the best practices include updating all affected software artifacts when a software artifact is updated.

16. The computer-implemented method of claim 14, wherein the best practices include having a given set of software components installed on different systems.

17. The computer-implemented method of claim 1, wherein one or more of the order of changes are persistently stored after being created.

18. The computer-implemented method of claim 1, wherein a component is one of a service, an application, middleware, hardware, an operating system, a storage system, a network device, and a system associated with a computing environment.

19. A system for automatically determining an allowable order of changes in a distributed system, the system comprising:
  a processor; and
  a memory storing code accessible by the processor to:
  receiving a request for change;
  wherein the request for change describes a task to be done on at least one target system, and a deadline by which a change needs to be completed;
  determining existing relationship descriptions between components of the distributed system, wherein the components of the distributed system are implemented on a plurality of managed resources;
  transforming acquired relationships into ordered tasks that are linked by temporal ordering constraints which describe when tasks can begin in relation to one another, wherein the temporal ordering constraints are selected from the group consisting of: Finish-to-Start, Start-to-Start, Finish-to-Finish, and Start-to-Finish;
  creating an order of changes taking into account the temporal ordering constraints, wherein creating the order of changes includes determining whether the ordered changes are conflicting and flagging such conflicts and further includes an estimate of the time required to complete a change;
  wherein the order of changes transitions the at least one target system from one workable state into another workable state;
  building a Task Graph from the order of changes, wherein the Task Graph represents each task to be completed within an overall job;
  constructing an Annotated Task Graph by assigning estimated durations to each task within the Task Graph; and
  computing a makespan for the overall job represented by the Task Graph, wherein the Annotated Task Graph is returned to an administrator.

20. The system of claim 19, wherein the order of changes is sequential.

21. The system of claim 19, wherein the order of changes is concurrent.

22. The system of claim 19, further comprising an arrangement for refining an incoming request for change by breaking the incoming request down into sub-requests.

23. The system of claim 22, further comprising an arrangement for computing an allowable order of changes by interacting with the distributed system.

24. The system of claim 22, wherein a total change time is minimized by exploiting parallelism between change tasks.

25. The system of claim 19, wherein the ordered changes are partially ordered.

26. The system of claim 19, wherein the ordered changes are totally ordered.

27. The system of claim 19, wherein the creation of the order of changes further takes into account a requested change management operation.

28. The system of claim 19, wherein a requester identifies one or more target systems within the distributed system by name.

29. The system of claim 28, wherein the names of the target systems are unique physical identifiers.

30. The system of claim 28, wherein the names of the target systems are logical names which refer to one or more physical systems.

31. The system of claim 19, wherein a requester does not identify one or more target systems within the distributed system by name.

32. The system of claim 19, further comprising an arrangement for accessing and evaluating policy rules representing best practices.

33. The system of claim 32, wherein the best practices include updating all affected software artifacts when a software artifact is updated.

34. The system of claim 32, wherein the best practices include having a given set of software components installed on different systems.

35. The system of claim 19, wherein one or more of the order of changes are persistently stored after being created.

36. The system of claim 19, wherein a component is one of a service, an application, middleware, hardware, an operating system, a storage system, a network device, and a system associated with a system associated with computing environment.

37. A program storage device readable by machine, tangibly embodying a program of instructions executable by the machine to perform method steps for automatically determining an allowable order of changes in a distributed system, said method comprising the steps of:

receiving a request for change;

wherein the request for change describes a task to be done on at least one target system, and a deadline by which a change needs to be completed;

determining existing relationship descriptions between components of the distributed system, wherein the components of the distributed system are implemented on a plurality of managed resources;

transforming acquired relationships into ordered tasks that are linked by temporal ordering constraints which describe when tasks can begin in relation to one another, wherein the temporal ordering constraints are selected from the group consisting of: Finish-to-Start, Start-to-Start, Finish-to-Finish, and Start-to-Finish;

creating an order of changes taking into account the temporal ordering constraints, wherein creating the order of changes includes determining whether the ordered changes are conflicting and flagging such conflicts and further includes an estimate of the time required to complete a change;

wherein the order of changes transitions the at least one target system from one workable state into another workable state;

building a Task Graph from the order of changes, wherein the Task Graph represents each task to be completed within an overall job;

constructing an Annotated Task Graph by assigning estimated durations to each task within the Task Graph; and computing a makespan for the overall job represented by the Task Graph, wherein the Annotated Task Graph is returned to an administrator.

* * * * *